United States Patent [19]

Klein et al.

[11] Patent Number: 5,649,162

[45] Date of Patent: Jul. 15, 1997

[54] LOCAL BUS INTERFACE

[75] Inventors: Dean A. Klein, Lake City; Daniel P. Wilde, Red Wing, both of Minn.

[73] Assignee: Micron Electronics, Inc., Nampa, Id.

[21] Appl. No.: 66,400

[22] Filed: May 24, 1993

[51] Int. Cl.$^6$ .................................................. G06F 13/42
[52] U.S. Cl. ..................... 395/500; 364/239.3; 364/240; 364/240.8
[58] Field of Search ................................. 395/325, 500, 395/425

[56] References Cited

U.S. PATENT DOCUMENTS

| | | |
|---|---|---|
| Re. 34,100 | 10/1992 | Hartness . |
| 3,568,160 | 3/1971 | Talarzyck . |
| 4,092,732 | 5/1978 | Ouchi . |
| 4,215,400 | 7/1980 | Denko . |
| 4,366,538 | 12/1982 | Johnson et al. . |
| 4,366,539 | 12/1982 | Johnson et al. . |
| 4,476,526 | 10/1984 | Dodd . |
| 4,486,881 | 12/1984 | de Couasnon . |
| 4,558,429 | 12/1985 | Barlow et al. . |
| 4,598,357 | 7/1986 | Swenson et al. . |
| 4,607,346 | 8/1986 | Hill . |
| 4,608,688 | 8/1986 | Hansen et al. . |
| 4,722,085 | 1/1988 | Flora et al. . |
| 4,733,396 | 3/1988 | Baldwin et al. . |
| 4,761,785 | 8/1988 | Clark et al. . |
| 4,771,375 | 9/1988 | Beglin et al. . |
| 4,773,036 | 9/1988 | Berens et al. . |
| 4,775,978 | 10/1988 | Hartness . |
| 4,814,981 | 3/1989 | Rubinfeld . |
| 4,817,035 | 3/1989 | Timsit . |
| 4,849,929 | 7/1989 | Timsit . |
| 5,113,369 | 5/1992 | Kinoshita ............................... 395/325 |
| 5,206,943 | 4/1993 | Callison et al. ........................ 395/425 |
| 5,220,651 | 6/1993 | Larson ..................................... 395/250 |
| 5,235,689 | 8/1993 | Bake et al. ............................. 395/425 |
| 5,295,247 | 3/1994 | Chang et al. ........................... 395/325 |
| 5,301,281 | 4/1994 | Kennedy ................................. 395/325 |
| 5,430,849 | 7/1995 | Banks ...................................... 395/325 |

FOREIGN PATENT DOCUMENTS 1014664  7/1977  Canada .

OTHER PUBLICATIONS

Research Report: Error–Correcting Codes for Interleaved Disks with Minimal Redundancy, M. Y. Kim and A. M. Patel, May 31, 1985.
"An Array of Protection for Server Data", Jim Carr, Data Communications, May 1992.
"Synchronized Disk Interleaving", Michelle Y. Kim, IEEE Transactions on Computers, Nov. 1986.
"Performance Parallel Disk Systems for Ultra High–Speed Data Storage," brochure from Storage Concepts (undated).
"MV Series Disk Subsystems," brochure from Storage Concepts, Aug. 1988.
"VMEplus Disk Subsystems," brochure from Storage Concepts, May 1988.
"Parallel Operation of Magnetic Disk Storage Devices: Synchronized Disk Interleaving," M.Y. Kim (undated).
"Disk Striping", Kenneth Salem, Princeton University Department of Computer Science, Dec. 1984.
"Providing Fault Tolerance in Parallel Secondary Storage Systems", A. Park and K. Balasubramanian, Princeton University Department of Computer Science, Nov. 7, 1986.
Seagate SCSI Interface Specification, Elite Product Family, Document No. 6471702, Jun. 1991 Rev. C.
Seagate Product Specification, ST42400ND Elite Disk Drive, Document No. 64403501, Apr. 1992 Rev. A.

(List continued on next page.)

*Primary Examiner*—Kevin J. Teska
*Assistant Examiner*—Ayni Mohamed
*Attorney, Agent, or Firm*—Dorsey & Whitney

[57] ABSTRACT

A local bus interface for providing high-speed data transfer between the local bus of a personal computer and one or more data storage devices. The local bus interface bypasses the standard expansion bus (ISA, EISA, Micro Channel) on the personal computer, is directly connected to the local bus, and is transparent to the system software.

5 Claims, 11 Drawing Sheets

OTHER PUBLICATIONS

"Mass Storage, Networking Explored at Systems Meeting," Electronic Design, Apr. 27, 1889.

"Ciprico Enters Disk Arrays", Electronic Times, Mar. 27, 1989.

Peripheral Component Interconnect (PCI) Revision 1.0 Specification, Jun. 27, 1992.

Peripheral Component Interconnect (PCI), Revision 2.0 Specification, Mar. 11, 1993.

Peripheral Component Interconnect (PCI), Revision 1.0 Specification, Jun. 22, 1992.

VESA VL–Bus Preliminary Specification, Revision No. 0.8, Jun. 1, 1992.

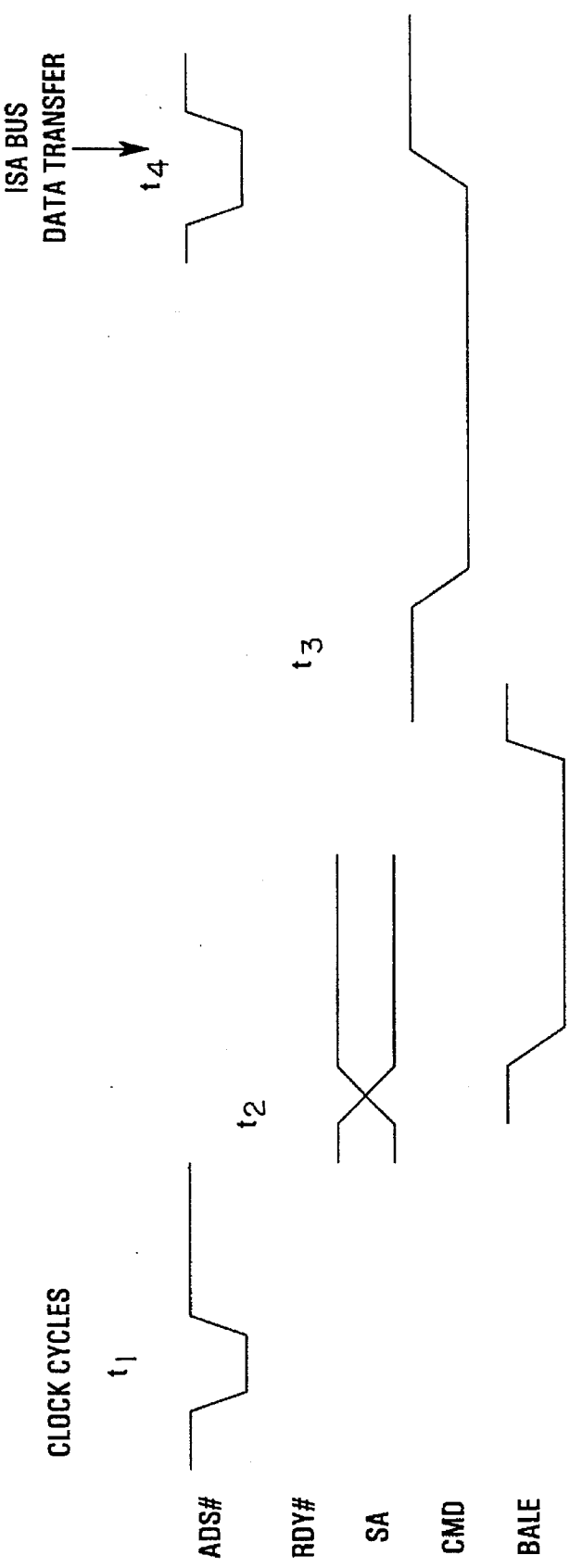

PCI PIN LIST

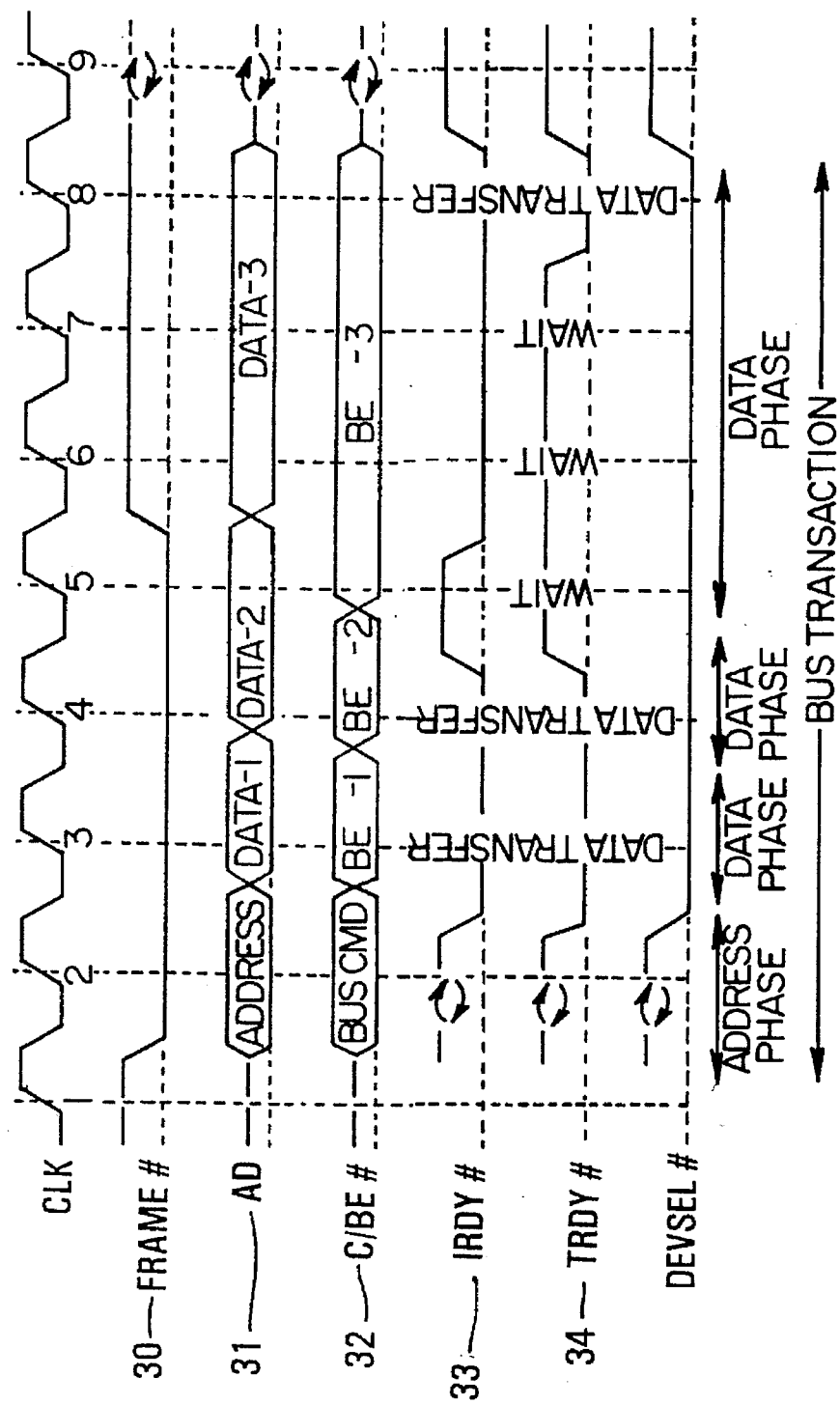

LOCAL BUS INTERFACE

BACKGROUND OF THE INVENTION

The present invention relates generally to personal computers, also known as microcomputers. In particular, the present invention relates to an interface between the local bus of a personal computer (PC) and one or more data storage devices. The interface facilitates high speed data transfers (reads and writes) from the central processor of the PC over the local bus to the data storage devices. The present invention allows for faster data transfers than transfers through standard data storage interfaces that may be connected to the local bus or to the standard input/output expansion slots (ISA, EISA, and Micro Channel), generally found in PC architecture.

Personal computers can be characterized as single central processor devices. PCs have a single, multi-functional, general-purpose central processor (CPU) providing the computational power for the computer. The CPU is located on the motherboard which also includes other core logic chips and high speed memory (cache, DRAM). Although a PC is generally a single CPU device, a PC may include other devices called processors, e.g., math co-processors, processors on the keyboard and processors on disk drives. CPUs are made by a variety of manufacturers, including Intel Corporation, Advanced Micro Devices, and Motorola.

Since PCs first appeared in the 1970s, new generations of CPU have provided more computational power. This "power" can be identified by the increased clock speed of the devices, meaning that operations are being performed faster, and by wider buses (8-bit to 16-bit to 32-bit to 64-bit) that allow more data or instructions to be moved at a time. In order to fully realize the capability of the increasingly powerful CPUs, the related devices (memory, add-on cards, etc.) should operate at the same level.

For example, powerful CPUs need to access a certain amount of memory very quickly to fetch key instructions. This high speed memory (cache, DRAM) is located closest to the CPU, but has limited storage capacity (e.g., cache 1 Mbyte, DRAM typically 64 Mbytes but up to 256 Mbytes). Larger-capacity data storage devices, such as hard disk drives, serve as the primary data storage component of a PC. PC hard disk drives include several magnetic data storage disks and typically have up to 540 Mbytes of memory available (drive manufacturers are continuously developing larger capacity drives). Generally available PC-type hard disk drives have 16-bit data ports for data transfer and support a fixed sector size of 512 bytes.

Over time, there has evolved a hierarchy of needs for the CPU and a related hierarchy in the PC structure. In order to meet the most time-critical needs of the CPU, the concept of the local bus was implemented in PC architecture. In short, a local bus is a high-speed bus accessing a limited number of devices by direct addressing. The local bus provides cost and reliability advantages, a smaller power budget, and higher density packaging, in addition to its high speed performance. However, the local bus is not a general purpose expansion bus and does not allow for a large number of input/output connections. The term "local bus" also includes the concept of a "mezzanine" bus that is separate from the physical local bus of the CPU. Examples of such local bus interfaces are the VL-Bus™ and Peripheral Component Interconnect (PCI) bus. A general block diagram of the PCI bus is shown in FIG. 1.

As shown in FIG. 1, the local bus 1 can be conceptualized as a component interface for a limited group of I/O devices. There is another level of component or board interface, the standard expansion bus 2 (ISA, EISA, Micro Channel). The expansion bus 2 is the standard interface for additional data storage devices and add-on boards. The problem with using the expansion bus 2 for data read/write operations is that it is slow, i.e., it takes numerous clock cycles from the time the CPU signals the initiation of an operation before a data storage device on the expansion bus 2, such as a hard disk drive, is capable of completing the operation.

FIG. 2 is a timing diagram of a read or write operation from the CPU to a hard disk drive on the expansion bus showing the delay from the time the CPU places an address on the local bus until the time a disk drive connected to the expansion bus can complete the operation. At time $t_1$, the CPU initiates an operation with an address (ADS#) strobe. Several clock cycles later, at time $t_2$, the system address line (SA) shows that the address is valid on the expansion bus. Next, buffered address latch enable line (BALE) is asserted, starting the expansion bus cycle. At time $t_3$ the command line (CMD) is asserted for several clock cycles, depending on the timing of the particular hard disk drive performing the read or write operation (signalled on the IOR or IOW lines). Finally, at time $t_4$ the ready (RDY#) signal designates the operation is complete. (This signal is actually generated by expansion bus chip set 3 in FIG. 1, acting as the expansion bus controller.) A PC that could access large data storage by means faster than access via the expansion bus 2 would be a distinct improvement over the prior art.

The disparity of bus widths between newer CPU's and standard hard drives is another limiting factor for PC I/O operations. Generally available PC hard disk drives have data port widths of a maximum of 16 bits. New generations of CPUs, such as the Intel i486™ CPU, are 32-bit devices. Further, 64-bit devices are currently being implemented, e.g., the Intel Pentium™. Therefore, if a 32-bit (or 64-bit) CPU wants to read or write to a conventional hard disk drive, then each 32-bit (or 64-bit) data word must be at least divided into 16-bit words, and the two (or four) 16-bit words must be sent sequentially to the hard disk drive. Therefore, there is a need to overcome this second limitation in PC data storage, the bottleneck created by data words on the larger data path of the CPU being sent to the smaller data port of the hard disk drive.

SUMMARY OF THE INVENTION

Accordingly, it is an object of this invention to overcome the problems in the prior art identified above.

It is a further object of this invention to provide an interface connected directly to the local bus of the PC and directly to one or more hard disk drives for high speed data transfer.

It is a further object of this invention to provide an interface between a local bus of a given width and one or more data storage devices having data ports of a width smaller than the local bus data width, whereby the interface divides the data from the local bus and sends it to one or more disk drives for a faster data transfer.

It is yet a further object of this invention to provide an interface between a PC local bus and one or more hard disk drives where the interface interleaves data from two or more hard disk drives to exploit the full data bus width of the local bus.

It is a further object of the present invention to provide an interface as described above that is transparent to the application software running on the PC.

It is yet a further object of the present invention to provide an interface as described above that is connected to hard disk drives using standard disk drive interfaces, such as IDE.

It is a further object of this invention to provide an interface as described above having the further capability of initializing the disk drives sector size based on the number of drives connected to the interface.

It is a further object of the invention to provide an interface as described above that can be connected to a number of local bus specifications including the VL-Bus™ and Peripheral Component Interconnect (PCI) bus.

BRIEF DESCRIPTION OF THE DRAWINGS

FIG. 2 is a timing diagram of a read or write operation from a CPU to a hard disk drive connected to a standard expansion bus as known in the prior art.

FIG. 8 is a clock diagram of a write operation for the present invention.

DETAILED DESCRIPTION OF THE PREFERRED EMBODIMENT

The local bus interface of the present invention may be used in PCs incorporating CPUs having different sized buses (32-bit, 64-bit) and from different manufacturers. It can also accommodate disk drives with different disk interfaces. It is transparent to most application software. For the illustrative purpose of this detailed description, the CPU will be a 32-bit processor with a PCI local bus configuration. PCI specification, revision 2.0, Mar. 11, 1993, is incorporated herein by reference. However, one of ordinary skill in the art can apply the teaching herein to implement the present invention in other PC configurations, including other local bus specifications, 64-bit CPUs, and different disk drive interfaces, without undue experimentation.

Figure 1:
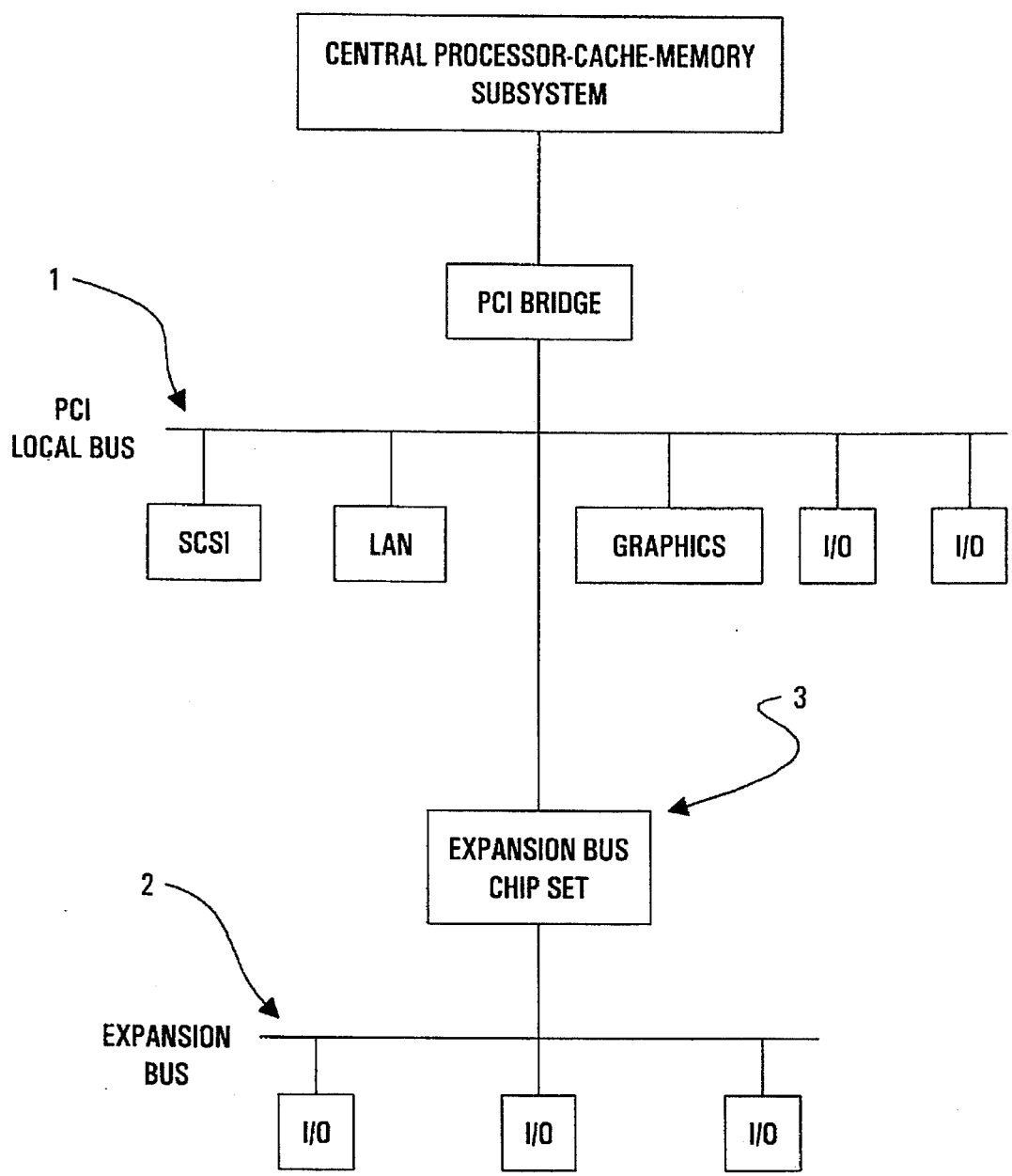
FIG. 1 is a general block diagram of the Peripheral Component Interconnect system.
Figure 1A:
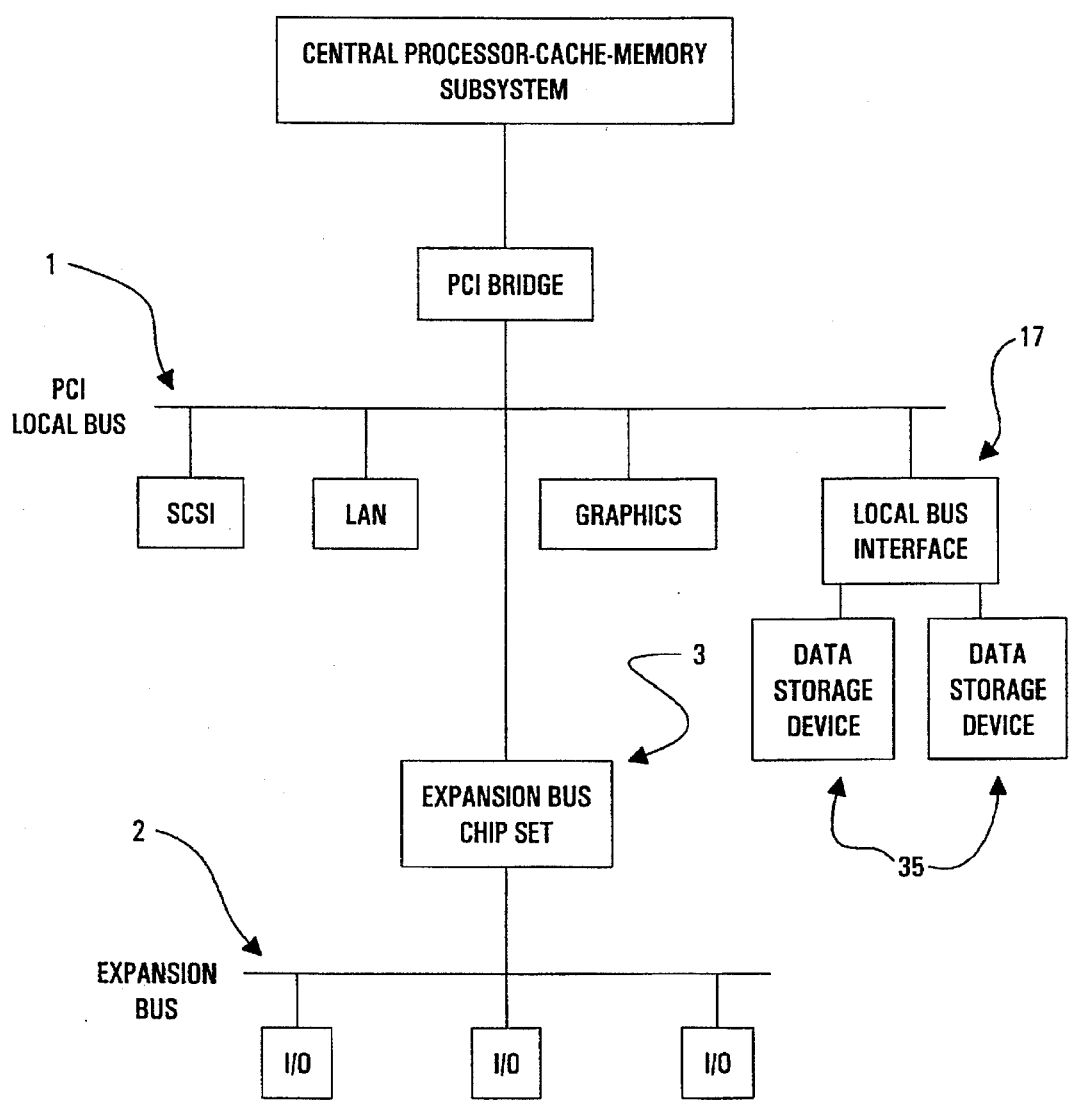
FIG. 1a is a general block diagram of the Peripheral Component Interconnect system with the local bus interface of the present invention directly attached.

The local bus interface 17 of the present invention, as shown in FIG. 1a, is an intermediate device between a local bus of a PC and one or more data storage devices 35, preferably hard disk drives. The local bus interface 17 is directly connected to both the local bus 1 and the disk drives 35 without the need for additional logic or software. The local bus interface is directly addressed by the CPU.

The local bus interface 17 of the present invention provides several major improvements in mass data storage on a PC. First, it provides for faster read/write operations, because it is directly connected to the local bus 1, instead of to the slower standard expansion bus 2. Second, it includes a buffer so that data to be written to data storage can be latched into the buffer and the local bus interface 17 can signal the CPU that the write operation is complete, allowing the CPU to proceed with the next operation instead of having to wait for the disk drive to complete a write operation. Finally, the local bus interface includes the capability to connect more than one disk drive directly to the interface. The invention allows the local bus interface to take a 32-bit word from the local bus and divide it into two 16-bit words and send these 16-bit words to separate disk drives substantially simultaneously, avoiding the additional latency of having to wait for two write cycles to a single disk drive. The same advantage is obtained in a read operation, where the local bus interface can read data from two drives substantially simultaneously.

This capability provided by the present local bus interface 17 is even more beneficial with a 64-bit CPU. The local bus interface can be connected to four disk drives (each with a 16-bit data port) and can divide the 64-bit word into four 16-bit words, sending (or receiving) them substantially simultaneously to (or from) the four drives.

In order to achieve the benefits of performing read and write operations to multiple disk drives without wasting data storage space on the disk drives, one must consider the issue of sector size. The CPU can be programmed to anticipate defined sector sizes on the hard disk drives, generally 512 bytes. If the CPU is initialized to expect 512-byte sectors and each of the drives connected to local bus interface is initialized with 512 byte sectors, then only half of each sector on each disk drive is used for every 512 byte sector identified as storage by the CPU. For example, if the CPU calls for a write to fill an entire sector, 512 bytes, the local bus interface 17 will actually write 256 bytes to the same sector on each drive, because each 32-bit word is broken into two 16-bit words. Each 16-bit word is written to a separate drive.

Therefore, the present invention requires that the sector sizes for the drives attached be inversely proportional to the number of attached drives. As shown above, for a 512 byte standard sector and two disk drives attached, the sector size for each disk drive should be 256 byte. The general formula is disk sector size is equal to the CPU sector size divided by the number of drives connected to the local bus interface. The disk drive sector size may be initialized by a software command from the local bus interface, reprogramming the hard disk drive firmware, or by setting a jumper on the drives.

The local bus interface of the present invention may be implemented as a single chip. In that case, it is connected to the local bus 1 as follows. The CPU is located on the motherboard along with the PCI local bus, PCI expansion slots, other chip sets and controllers, as well as the ISA expansion ports. In the preferred embodiment of the present invention, the local bus interface is also located on the motherboard and directly connected to the PCI local bus. This leaves the PCI expansion slots open. The local bus interface can also be connected to the PCI local bus through one of the PCI expansion slots. Generally, there are 2–3 PCI expansion slots, each requiring 130-pin or larger connectors.

Figure 3:
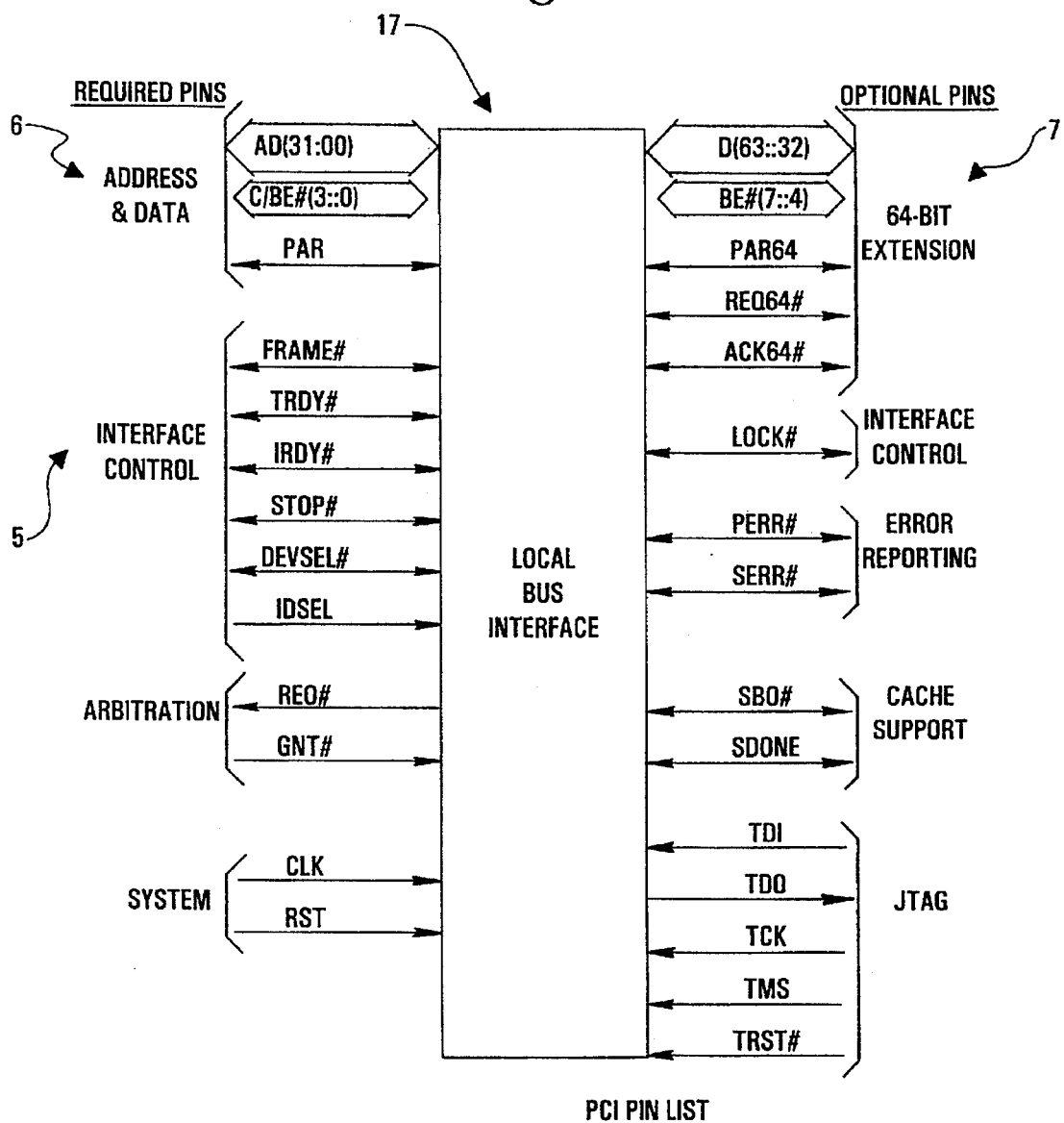
FIG. 3 is a partial pin list of the local bus interface of the present invention in an embodiment for connection to a PCI local bus.

A pin list for the local bus interface 17 connection to the PCI local bus 1 is shown in FIG. 3. Interface control group lines 5 include cycle frame (FRAME#), target ready (TRDY#), initiator ready (IRDY#), stop (STOP#), lock (LOCK#), initialization device select (IDSEL#) and device select (DEVSEL#). A symbol at the end of a signal name indicates that the active state occurs when the signal is at a low voltage.

Address and data lines 6 include address and data lines AD[31::00]. Address and data are multiplexed on the same pins. During the first clock cycle of an operation these lines contain the physical byte address, and during subsequent clocks of an operation they contain data. Therefore, a PCI bus transaction consists of an address phase followed by one or more data phases.

Bus command and byte enables (C/BE[3::0]) are also multiplexed on a common set of PCI pins. During the address phase of a transaction, these lines define the bus command and during the data phase these lines are used as byte enables. The byte enables determine which byte lanes carry meaningful data. 64-bit extension pins 7 can be used for a 64-bit device.

Figure 4A:
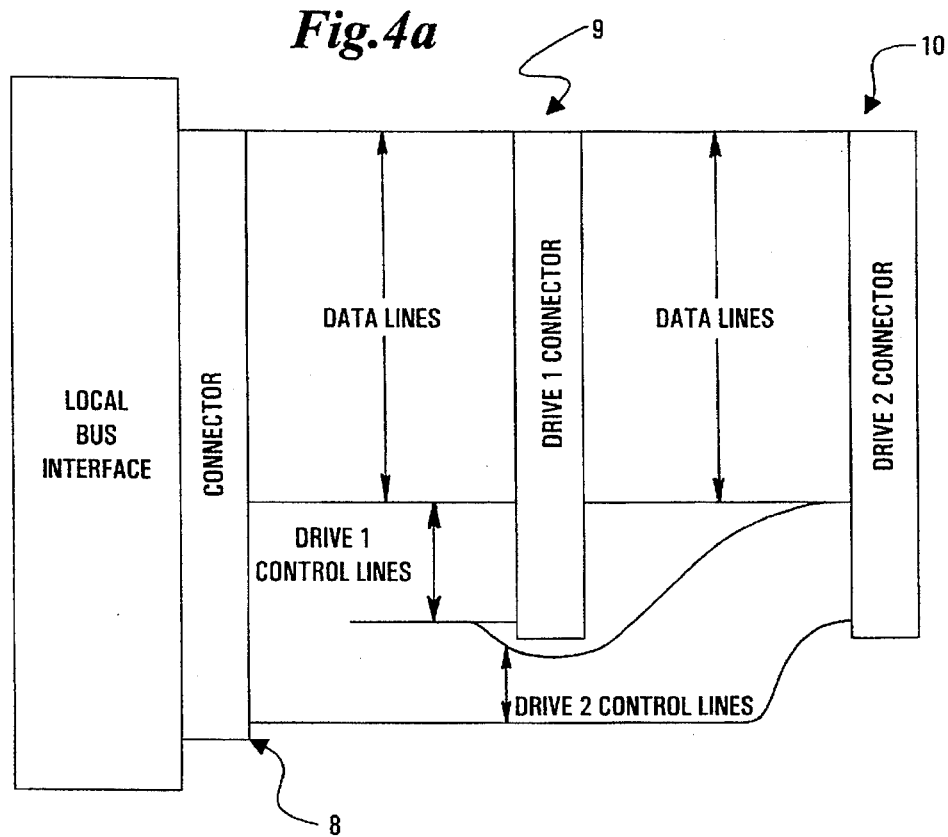
FIGS. 4a, 4b, and 4c show the connections between the local bus interface and disk drives for a single-connector/two-drive scheme, two-connector/two-drive scheme, and a single-connector/four-drive scheme, respectively.
Figure 4B:
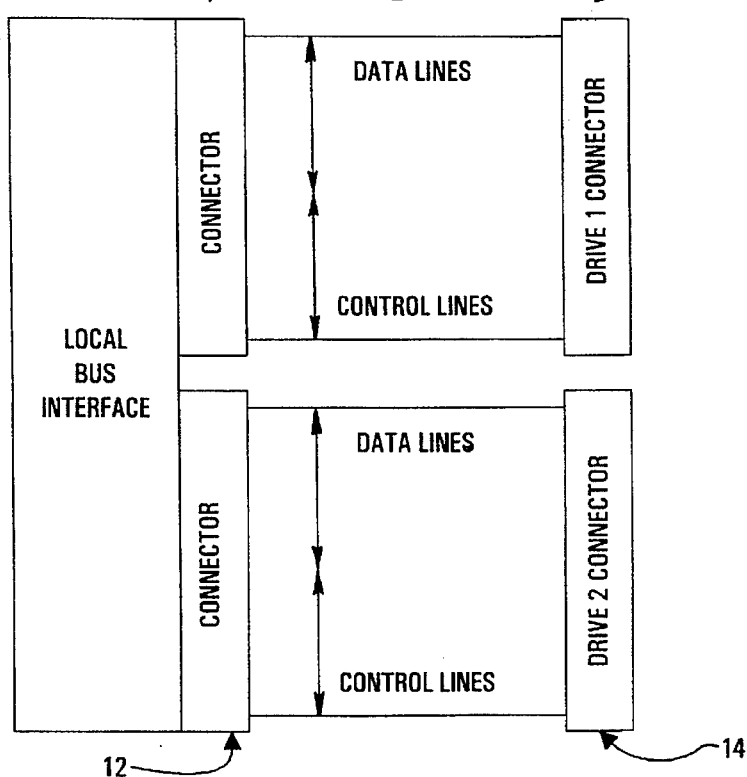
Figure 4C:
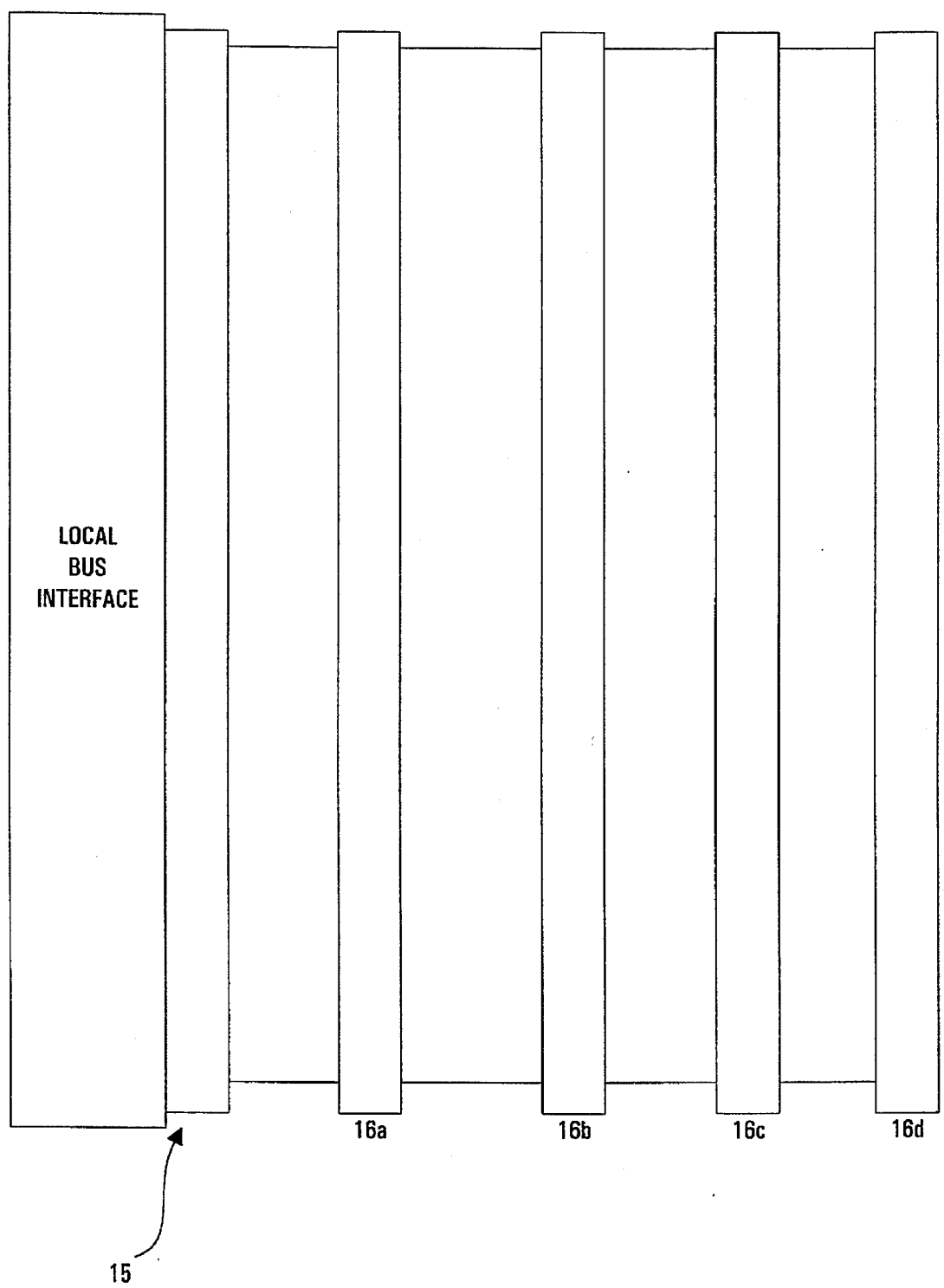

The local bus interface 17 of the present invention is also directly connected to one or more data storage devices such as hard disk drives 35. The local bus interface may include a buffer on the data path to the disk drives under certain circumstances, e.g., the local bus interface is powered at 3.3V and the disk drives are powered at 5.0V; however, no additional logic is required between the output of the local bus interface and the input of the disk drives. The local bus interface is connected to the disk drives as is presently known in the art. As shown in FIGS. 4a–c, the local bus interface will include one or more connectors for connection to the disk drives. In the preferred embodiment of the invention, the interface is connected to two hard disk drives. Each disk drive connection requires, at a minimum, sixteen data lines and eight control lines.

FIG. 4a shows one configuration of the present invention wherein a 50-pin connector 8 from the local bus interface is cabled to two 40-pin connectors 9, 10 at the two disk drives. Both disk drives share the same data path, but have separate sets of control lines from the local bus interface. In an alternative embodiment of the present invention as shown in FIG. 4b, the local bus interface has two 40-pin connectors 11, 12, with separate cable connecting to a 40-pin connector on each drive 13, 14. In another alternative embodiment of the present invention as shown in FIG. 4c, the local bus interface has a single 50-pin connector 15 cabled to as many as four 50-pin connectors in series, 16a, 16b, 16c, and 16d, one for each of the four disk drives connected to the local bus interface. This configuration would require an add-on interface board attached to each drive.

Figure 4D:
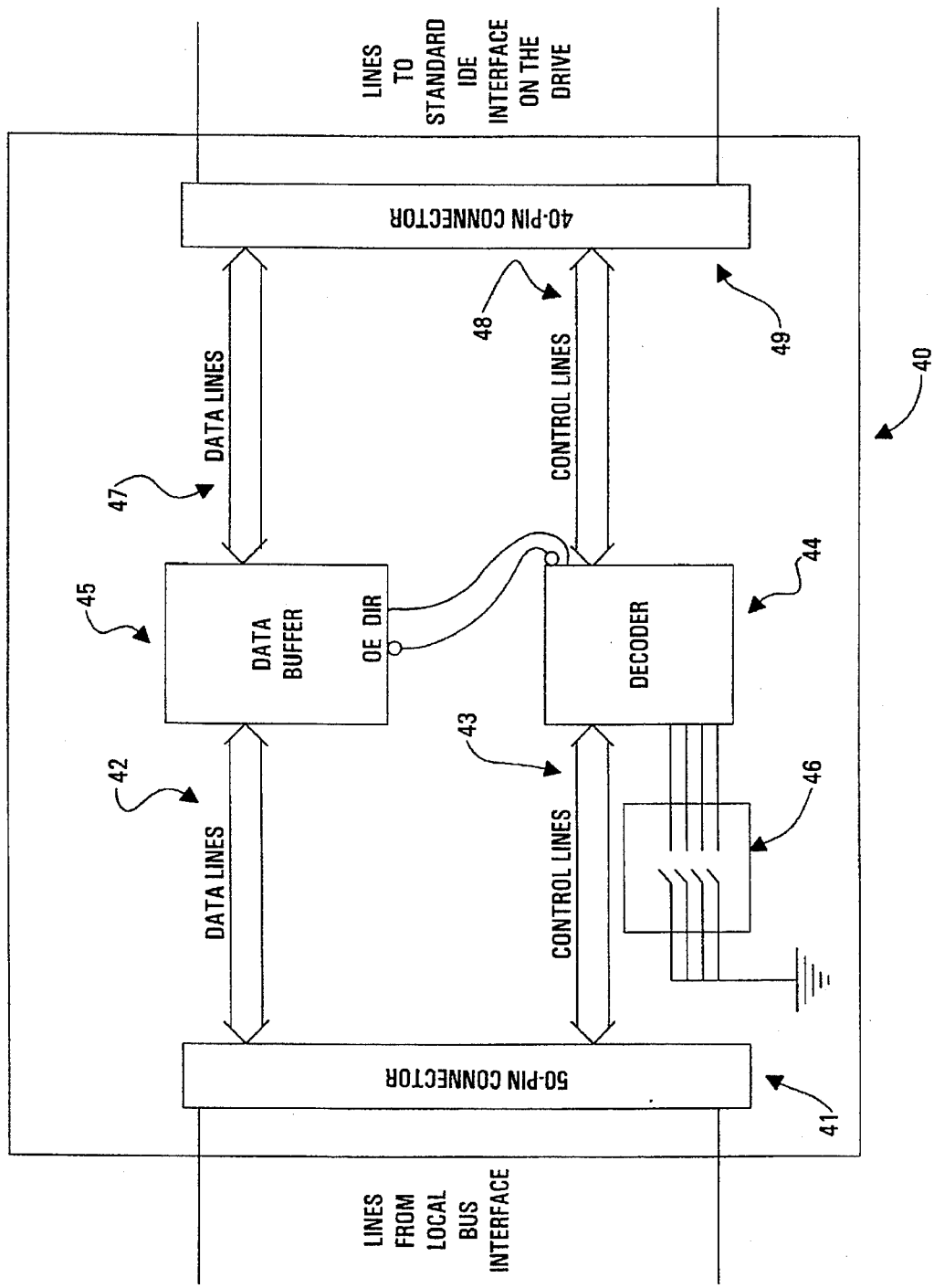
FIG. 4d is a block diagram of the add-on board for the configuration shown in FIG. 4c.

An add-on drive interface board 40 for the alternative embodiment of FIG. 4c is shown in FIG. 4d. An IDE+ interface is implemented between the local bus interface 17 and the drives (represented by 50-pin connectors 16a–d in FIG. 4c). A 50-pin connector 41 on the board 40 includes data lines 42 and control lines 43. A decoder 44 reads the CSØA and CSØB lines included in control lines 43 to determine which one of the drives is to receive the data. Data buffer 45 stores the data from data lines 42 allowing a faster data cycle on the IDE+ interface. Switch 46 identifies which drive on the cable is being accessed. If the board 40 is connected to the drive that is supposed to receive the data (based on the CSØA and CSØB lines), then the decoder 44 allows the signals on the control lines 43 and data lines 42 to pass on to control lines 48 and data lines 47 into 40-pin connector 49 which is cabled into the standard IDE interface connector on the drive.

Figure 5:
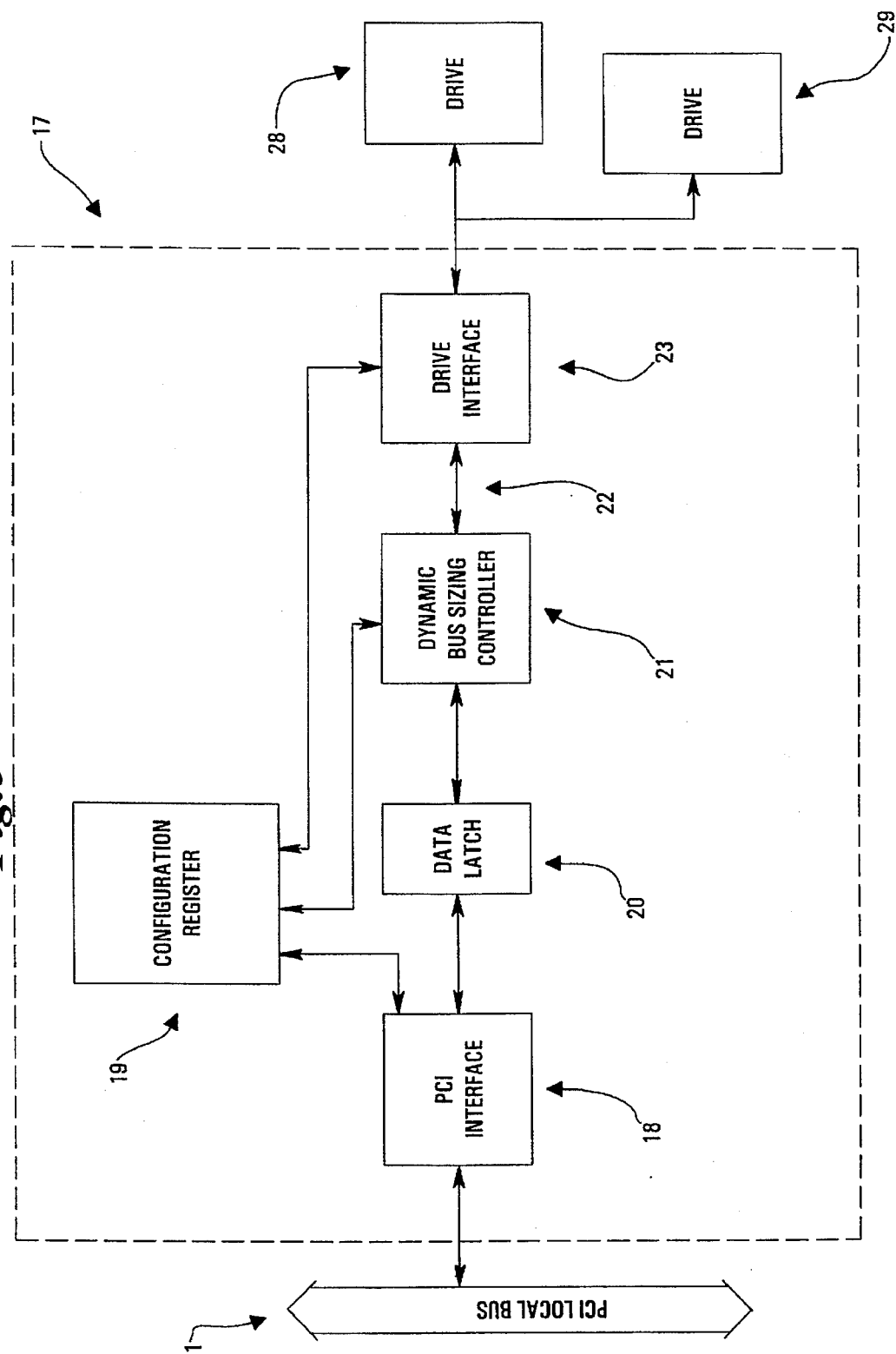
FIG. 5 is a block diagram of the present invention.

FIG. 5 provides a general block diagram of the local bus interface 17 of the present invention. In a write operation, PCI interface 18 decodes the address placed on the local bus 1 by the CPU. If the address is validated based on a comparison of the addresses stored in the configuration register 19, the data is placed on the local bus 1 by the CPU and latched into data latch 20 through PCI interface 18. As will be discussed further below, a target ready (TRDY#) signal is placed on the local bus informing the CPU that the write transaction has been completed.

This is an important feature of the present invention. Although the data from the PCI local bus has not actually been written to the hard disk drives, the CPU has been told that the write transaction is complete (by the TRDY# signal) and the CPU can then perform another operation. Compare this relatively fast operation to the operation from the CPU to a disk drive on the expansion bus, as shown in FIG. 2. With the present invention, the CPU does not have to wait for the latency of accessing the drive through the expansion bus nor the cycle of the drive itself. The present invention can latch the data from the local bus into the data latch 20 and immediately signal the CPU that the operation is complete in only a few clock cycles.

Figure 6:
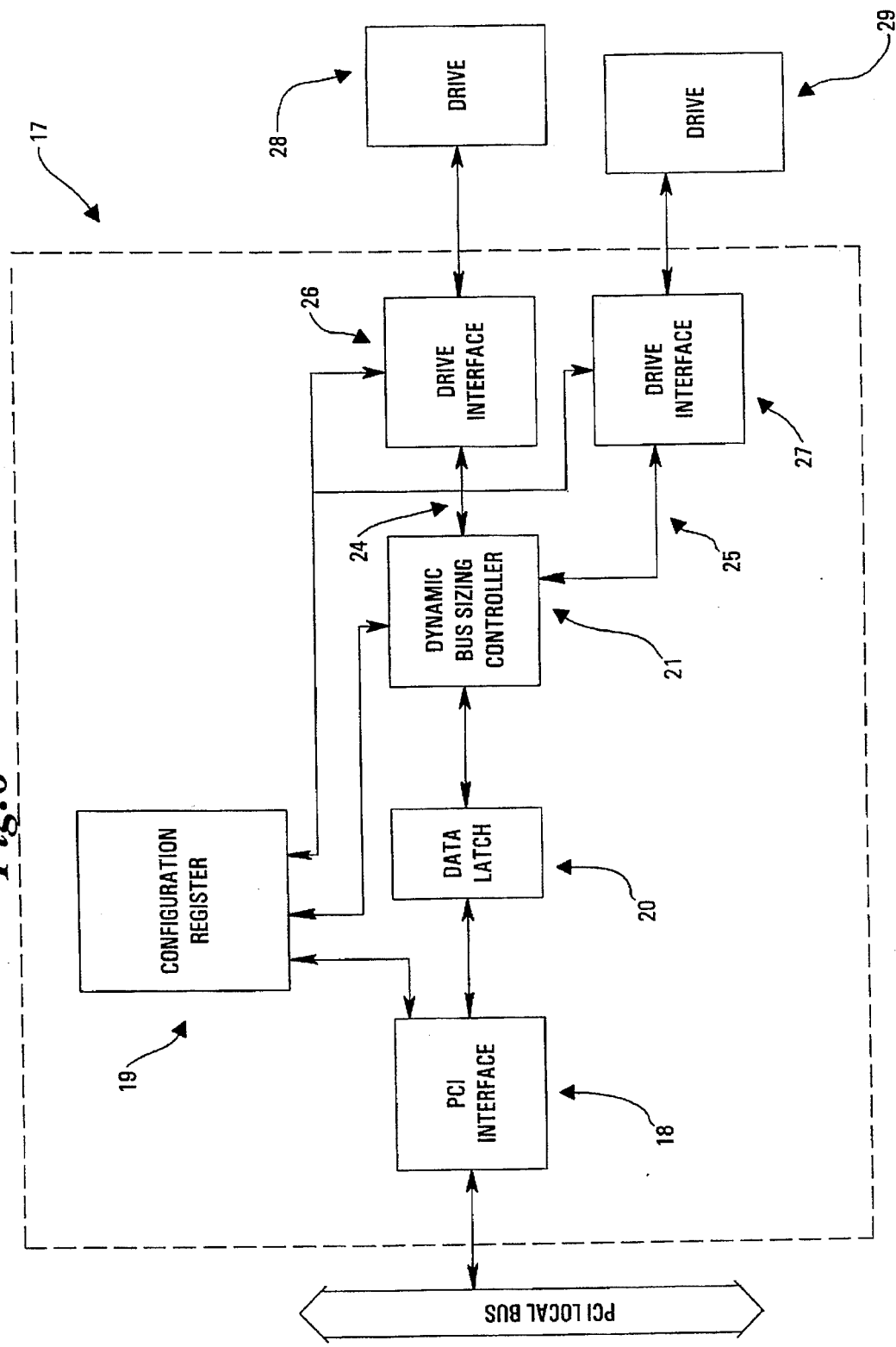
FIG. 6 is a block diagram of an alternative embodiment of the present invention.

The data latched into data latch 20 is then sent to dynamic bus sizing controller 21 where the 32-bit data word (or group) is divided into two 16-bit data words. The output of dynamic bus sizing controller 21 has two configurations. In one configuration, as shown in FIG. 5, the output of dynamic bus sizing controller 21 is only one set of 16 data lines 22. Therefore, the two 16-bit words must be sent sequentially to drive interface 23. The drive interface 23 then sends the two 16-bit words, one to each disk drive 28, 29, according to standard disk drive interface specifications (e.g., IDE). In the second configuration, as shown in FIG. 6, dynamic bus sizing controller 21 has two sets of 16 data lines 24, 25, and there are two drive interfaces 26, 27, one for each drive 28, 29. Therefore, the two 16-bit words are sent substantially simultaneously to their respective drive interfaces 26, 27.

A read operation is performed in a similar manner. PCI interface 18 decodes an address from the local bus 1. The read operation is transmitted through the interface 17 with a separate read command being sent to both hard disk drives 28, 29. Each hard disk drive returns the addressed 16-bit words to their respective drive interfaces. In the configuration of FIG. 6, the reads from each hard drive 28, 29 can be performed substantially simultaneously, because each drive 28, 29 has a separate interface 26, 27 with the local bus interface 17. With the configuration of FIG. 5, the reads from each drive 28, 29 are interleaved through the single drive interface 23 into the dynamic bus sizing controller 21 where the two 16-bit words are combined. The dynamic bus sizing controller 21 always sends and receives the same 16-bit half of the 32-bit word to the same drive, e.g., the upper 16 bits always go to drive 1 and the lower 16 bits always go to drive 2. The combined 32-bit word is then sent through data latch 20 and placed on the PCI bus 1 by PCI interface 18.

Figure 7:
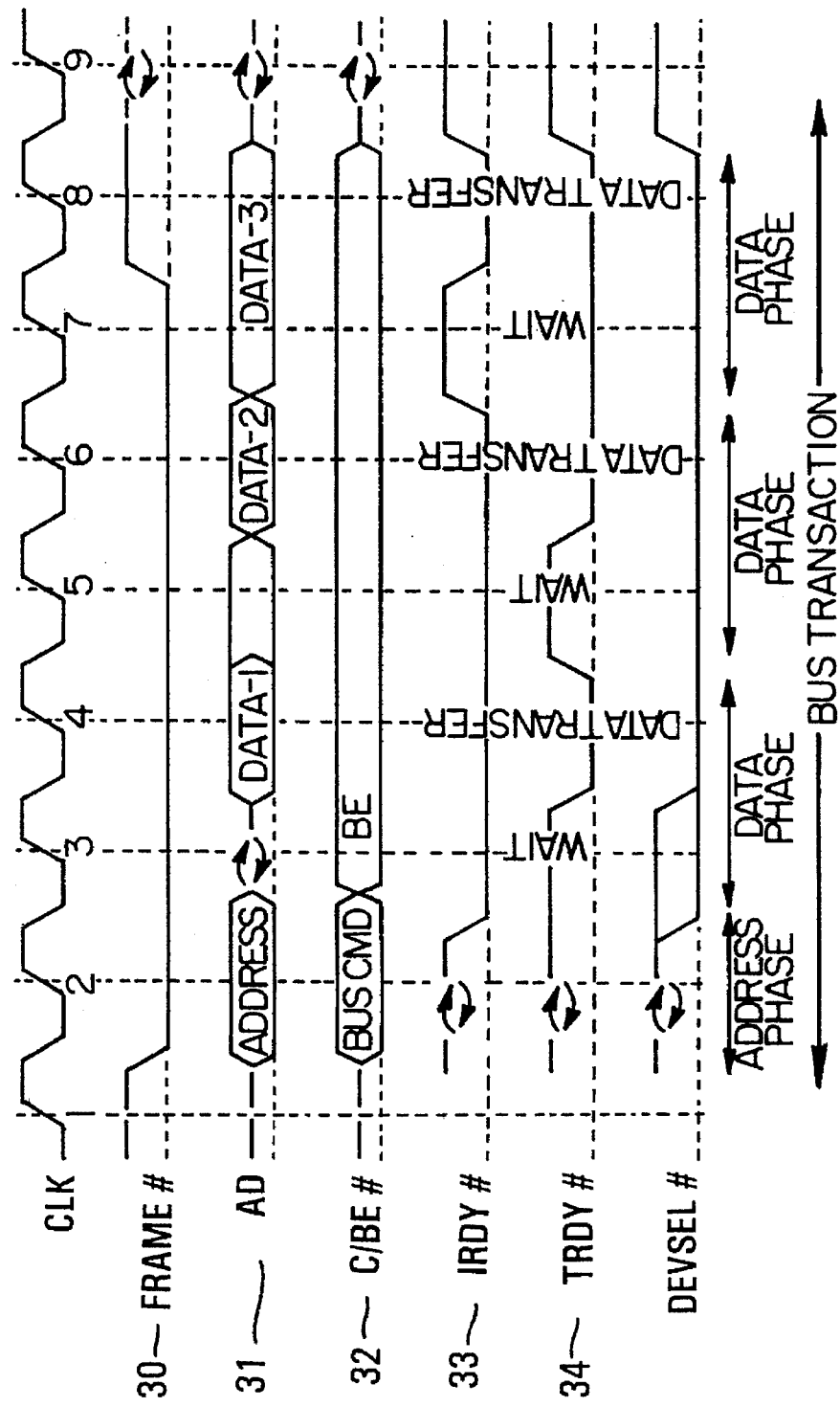
FIG. 7 is a clock diagram of a read operation for the present invention.

Timing diagrams showing the read and write operations performed by the present invention are shown in FIGS. 7 and 8, respectively. In the read operation of FIG. 7, FRAME#30 is asserted to initiate a bus transaction. AD[31::00]31 and C/BE[3::0]32 lines provide the address and bus command. For bus commands, the present invention is concerned with commands I/O read and I/O write. When both IRDY#33 and TRDY#34 are asserted, the data read from the disk drives is put on the local bus. It may be several clock cycles before the local bus interface 17 asserts TRDY#34 for the read, because it has to wait for the hard drives to send the addressed data. However, in the embodiment of FIG. 6, the two drives 28, 29 send their respective 16-bit words substantially simultaneously. In the configuration of FIG. 5, the data is interleaved, alternating between reads from each drive 28, 29. Even this configuration provides an improvement over a single drive, because the local bus interface 17 can receive data from one drive while the other drive is preparing the next 16-bit data word.

Also, the present invention implements the concept of a "prefetch" to take full advantage of data latch 20. Once a data read is initiated on the local bus 1 by the CPU, the local bus interface 17: (1) retrieves the two 16-bit words from the two drives 28, 29; (2) combines the two 16-bit words into a single 32-bit word; (3) places the 32-bit word on the local bus 1, and (4) prefetches the next 16-bit data word (i.e., initiates a read command) from each drive and puts the combined 32-bit word in the data latch 20, anticipating that the CPU will want the next 32-bit data word. This is an additional feature to speed up the data transfer.

Attached to this specification as an appendix is a sample listing of the system instructions for a read operation in a PC having the present invention. These instructions are typical for a read operation on a PCI local bus and show that there are no additional instructions necessary to implement the local bus interface of the present invention (i.e., the local bus interface is transparent to the system software).

FIG. 8 shows a clock diagram for a write transaction. Again, FRAME#30 starts the operation. AD[31::00]31 and C/BE[3::0]32 provide the address and bus command, in this case I/O write. Once IRDY#33 and TRDY#34 are asserted, the write transfer is made. Again, because of data latch 20, the local bus interface 17 does not have to wait for both disk drives 28, 29 in order to assert TRDY#34. The local bus interface 17 can go ahead and immediately assert TRDY#34 and store the 32-bit word from the local bus 1 in data latch 20.

The basic design of the present invention is the same for many PC configurations, including different CPUs, different local buses, and different drive interfaces. However, each particular set-up requires a local bus interface 17 with unique programming. Much of the programming is done in configuration register 19. For example, the cycle time, command time, and set up/hold times for particular types of disk drives can be programmed into the configuration register 19. Also, configuration register is connected to dynamic bus sizing controller 21 and drive interface 23 (or drive interfaces 26, 27). The configuration register 19 includes the number of drives that are connected to the local bus interface 17, information needed by both the dynamic bus sizing controller 21 and drive interface 23 (or drive interfaces 26, 27). Also, the configuration register 19 includes the code for the prefetch operation needed by the drive interface 23 (or drive interfaces 26, 27).

The present invention may be embodied in other specific forms without departing from the essential attributes thereof. It is desired that the embodiments described above be considered in all respects as illustrative, not restrictive, reference being made to the appended claims to indicate the scope of the invention.

What is claimed as new and desired to be protected by Letters Patent is:

1. A device for connecting a plurality of data storage devices to a local bus of a personal computer, comprising:
   (a) local bus connection means for connecting the device directly to a local bus, the local bus including a data bus;
   (b) address decode means for decoding an address from the local bus connection means;
   (c) data latching means for latching data being received from or sent to the local bus,
   wherein the data latching means is capable of accepting data coming from the local bus at a higher rate than the storage devices are capable of accepting data, and
   wherein the data latching means makes the local bus available for another purpose before the data is fully written to the storage devices during a write operation; and
   (d) a dynamic bus sizing controller that carries out write operations by partitioning a unit of data from the local bus into at least a first smaller unit of data and a second smaller unit of data, and then communicates the first smaller unit of data to a data storage port on a first data storage device and the second smaller unit of data to a data storage port on a second data storage device in a non-sequential manner, and
   wherein the dynamic bus sizing controller carries out read operations by combining a first unit of data from the data storage port on the first data storage device and a second unit of data from the data storage port on the first storage device into a combined unit of data that can be placed on the local bus connection means.

2. The device of claim 1 wherein the data storage devices are disk drives.

3. The device of claim 1 further including initializing means for initializing the sector size of the data storage devices based on the number of data storage devices connected to the local bus interface means.

4. The device of claim 1 wherein the local data bus width is N bits and the data storage port width is N/2Q bits, wherein Q=any integer greater than zero.

5. A personal computer comprising:
   (a) a processor;
   (b) a local bus having a local bus data path of at least 32 bits, wherein the local bus is connected to the processor;
   (c) a plurality of disk drives, each having a 16-bit data port width;
   (d) an address decoder that is connected to the local bus for decoding an address on the local bus;
   (e) a buffer that is connected to the local bus data path, wherein the buffer is capable of storing data coming from the local bus prior to transfer to the disk drives so that the local bus is available for another purpose before data is fully written to the disk drives during a write operation; and
   (f) a dynamic bus sizing controller that is connected to the buffer and the plurality of disk drives,
   wherein the dynamic bus sizing controller carries out write operations by partitioning a unit of data from the buffer into 16-bit units of data, and then communicating each of the 16 bit units of data to a different one of the disk drives in parallel, and
   wherein the dynamic bus sizing controller carries out read operations by reading a 16-bit unit of data from each of the disk drives in parallel, and then combining the 16-bit units of data into a single unit of data that fits on the local bus data path.

\* \* \* \* \*